US007840827B2

(12) United States Patent
Dahan et al.

(10) Patent No.: US 7,840,827 B2
(45) Date of Patent: Nov. 23, 2010

(54) DISPLAY POWER MANAGEMENT

(75) Inventors: Franck Dahan, Nice (FR); Franck Seigneret, Roquefort les pins (FR); Gilles Dubost, Valbonne (FR); Jean Noel, Nice (FR)

(73) Assignee: Texas Instruments Incorporated, Dallas, TX (US)

( * ) Notice: Subject to any disclaimer, the term of this patent is extended or adjusted under 35 U.S.C. 154(b) by 953 days.

(21) Appl. No.: 11/559,386

(22) Filed: Nov. 13, 2006

(65) Prior Publication Data

US 2007/0109292 A1 May 17, 2007

(51) Int. Cl.
*G06F 1/32* (2006.01)

(52) U.S. Cl. ........................ 713/324; 713/320; 713/322; 345/545

(58) Field of Classification Search ......... 713/300-324, 713/601; 345/501, 520, 530, 531, 536, 539, 345/545, 547, 211, 212
See application file for complete search history.

(56) References Cited

U.S. PATENT DOCUMENTS 5,493,684 A 2/1996 Gephardt et al.
5,642,489 A 6/1997 Bland et al.
5,661,751 A 8/1997 Johnson
5,757,365 A * 5/1998 Ho ............................. 345/212
6,088,806 A * 7/2000 Chee .......................... 713/322
RE38,108 E 5/2003 Chee et al.
7,102,645 B2 * 9/2006 Chow ......................... 345/520
7,126,608 B2 * 10/2006 Alben et al. ................ 345/501
2007/0002036 A1 * 1/2007 Kardach et al. ............. 345/213

OTHER PUBLICATIONS

Mobile Computer Display Controller, Lynx3DM+Databook, May 21, 2002, pp. 1-349, Preliminary Version 0.8, Silicon Motion, Inc., U.S.A.
Chris Wellheuser, Metastability performance of Clocked FIFOs, 1996, pp. 1-12, Texas Instruments, U.S.A.

* cited by examiner

*Primary Examiner*—Dennis M Butler
(74) *Attorney, Agent, or Firm*—Wade J. Brady III; Frederick J. Telecky, Jr.

(57) ABSTRACT

An apparatus and method for power management of a display system. A display controller couples to a memory storage device. A frame buffer in the memory storage device is filled with frames of information for display on a display device. The frames of information transfer to a display buffer in the display controller. The display controller transmits the frames of information from the display buffer to the display device. When frame information is not being transferred to the display controller, the display controller and the memory storage device may separately enter a power saving state. In power saving state, the display controller may continue to transmit frame information to the display device; however, power and a clock signal to components of display controller may be limited. When the display buffer is almost empty, the display controller exits power saving state to fill the display buffer.

6 Claims, 3 Drawing Sheets

DISPLAY POWER MANAGEMENT

CROSS REFERENCE TO RELATED APPLICATION

This application claims priority to EPO Application No. 05292416.4, filed Nov. 14, 2005, incorporated herein by reference.

FIELD OF THE INVENTION

The present invention generally relates to power management in a display system. More particularly, the invention relates to power management during operation of the display system through control of power and clock signals.

BACKGROUND OF THE INVENTION

In an electronic device containing a display system, a display controller receives information from a processor or memory storage device and transmits the information to a display device. The information may be displayed on a display screen in the display device such as a liquid crystal display (LCD) or a cathode ray tube (CRT). In particular, the display controller converts digital information from the processor or memory storage device into signals useable by the display device. The display controller transmits the signals to the display device, and the display device displays the information, such as graphics or text, on the display screen. Some examples of display devices are as follows: a computer monitor, a laptop computer display, a portable music player display, a portable gaming device display, a cellular telephone display, and a personal digital assistant (PDA) display.

In a display system containing a display device and a display controller, the display system may include a frame buffer. A frame buffer is a portion of a memory storage device which stores frames of information to be displayed on the display screen of the display device. A frame of information contains pixel information to be displayed on the display screen. The display controller continually refreshes the display screen with frames of information from the frame buffer at a predefined and fixed rate. As the frames of information are sent to the display screen, the frame buffer is continually updated with upcoming frames of information by a component of the electronic device such as the processor.

As the display screen size in a portable electronic device increases, more pixels are required to fill the display screen. Thus, the size of each frame of information must increase. As a result, the storage capacity of the frame buffer must also increase. Therefore, portable electronic devices containing large display screens require large frame buffers. Large frame buffers may be costly, power consuming, and space consuming, characteristics which are not desirable in electronic devices. A compact, low cost, and power reducing display system that is capable of supporting large display screens in electronic devices would be preferred.

SUMMARY OF THE INVENTION

The problems noted above are solved by an apparatus, comprising a display controller and at least one display buffer. The display controller includes the at least one display buffer, a memory storage device coupled to the display controller, and a control module coupled to the display controller. The display controller is capable of entering a power saving mode.

The display controller may enter the power saving mode when the display controller no longer receives frame information. The display controller may exit the power saving mode when the display controller is to receive frame information. The apparatus may move between a plurality of power states, entering a first low power state when the display buffer is filling and entering a second low power state when the display buffer is emptying.

BRIEF DESCRIPTION OF THE DRAWINGS

FIG. 6, in accordance with some embodiments of the invention, shows a diagram of the states that the system shown in FIG. 3 may be in.

NOTATION AND NOMENCLATURE

Certain terms are used throughout the following description and claims to refer to particular device components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection or though an indirect electrical connection via other devices and connections. Furthermore, the term "information" is intended to refer to any data, instructions, or control sequences that may be communicated between components of the device. For example, if information is sent between two components, data, instructions, control sequences, or any combination thereof may be sent between the two components.

DETAILED DESCRIPTION OF THE EMBODIMENTS

In accordance with some embodiments of the invention, in an electronic device containing a display system, a display controller couples to a memory storage device. The memory storage device contains a frame buffer capable of storing frames of information to be transmitted to a display screen coupled to the display controller. Frame information from the frame buffer is transmitted to a display buffer in the display controller. The display controller transmits frame information stored in the display buffer to the display screen for display.

The display buffer fills with frame information much faster than the display controller transmits the frame information to the display screen. When frame information is not transferring from the memory storage device, the memory storage device and the display controller may enter a power saving state. In the power saving state, power and a clock signal transmitted to some components of the display controller may be reduced or removed. Power and the clock signal transmitted to the memory storage device may also be reduced or removed. When the frame buffer is near empty (i.e. needs to fill with frame information), the display controller and the memory storage device may exit the power saving state, and frame information may be transmitted to the frame buffer. Thus, power may be conserved in the display system.

Figure 1:
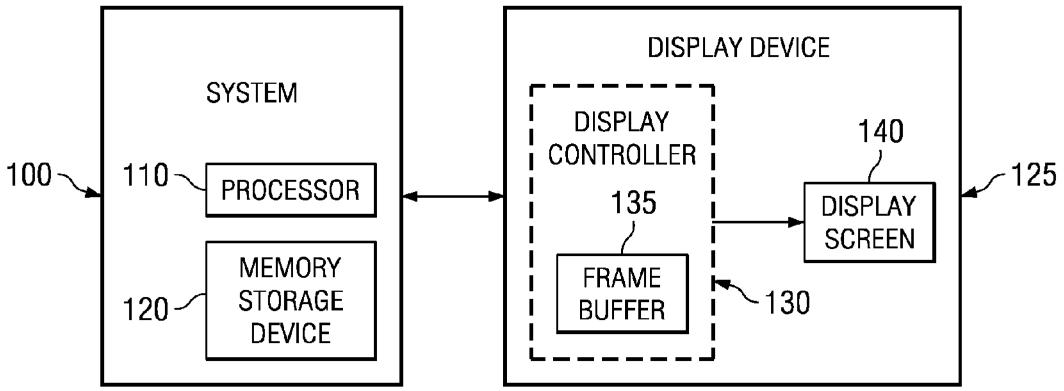
FIG. 1 shows a processor/memory system coupled to a display device, the display device containing a display screen and a display controller.

Referring to FIG. 1, a system 100 couples to a display device 125. System 100 includes a processor 110, memory storage device 120, and other components (not shown) commonly found in a computer system or application chip. Display device 125 consists of a display controller 130 coupled to a display screen 140. Display controller 130 contains a frame buffer 135, which is a memory storage device capable of storing frames of information to be displayed on display screen 140.

System 100 fills frame buffer 135 with frames of information to be displayed on display screen 140. For example, processor 110 or other device components may fill frame buffer with frames of information. The frame buffer may be filled at a rate faster than frame buffer 135 is capable of transmitting the frames of information to display screen 140. When frame buffer 135 is full of frames of information to be transmitted to display screen 140, frames of information no longer transfer to frame buffer 135. System 100 may perform other tasks when not transmitting frames of information to frame buffer 135. For example, system 100 may interact with other peripheral devices (not shown in figure).

Display screen 140 displays each frame of information stored in frame buffer 135. When frame buffer 135 reaches a low threshold, which may indicate frame buffer 135 needs more frames of information, system 100 fills frame buffer 135.

In FIG. 1, system 100 may enter a state in which frames of information displayed on display screen 140 do not change over time. For example, a cell phone may be in an idle state in which system 100 is inactive. Display screen 140 of the cell phone continually refreshes with the same frame or frames of information. Because the frames of information displayed on display screen 140 are not changing, frame buffer 135 does not need to be constantly filled by system 100.

In order to reduce power consumption of the cell phone, system 100 may enter a power saving state in which system 100 receives limited power and clock signals. System 100 may exit the power saving state when the frames of information stored in frame buffer 135 are to be updated. For instance, system 100 may update frame buffer 135 as a time display on display screen 140 changes, a user dials a number, or a user activates a preprogrammed function such as a game or a contact list.

The power saving techniques described above may be useful in systems that are battery dependent devices such as cellular telephones, gaming devices, PDAs, laptop computers, and music players. For system 100 to enter the power saving state when the frames of information for the image displayed on display screen 140 is not changing, frame buffer 135 must have the capacity to store all frames of information for the unchanging image. For a display device 125 with a large display screen 140, a large frame size may be needed, thus requiring a large frame buffer 135. A large frame buffer 135 may be difficult to integrate into display device 125 and prohibitively expensive. Thus, integrating display controller 130 into display device 125 may reduce power consumption in the device for small display screens but may not be appropriate for larger display screens 140.

Figure 2:
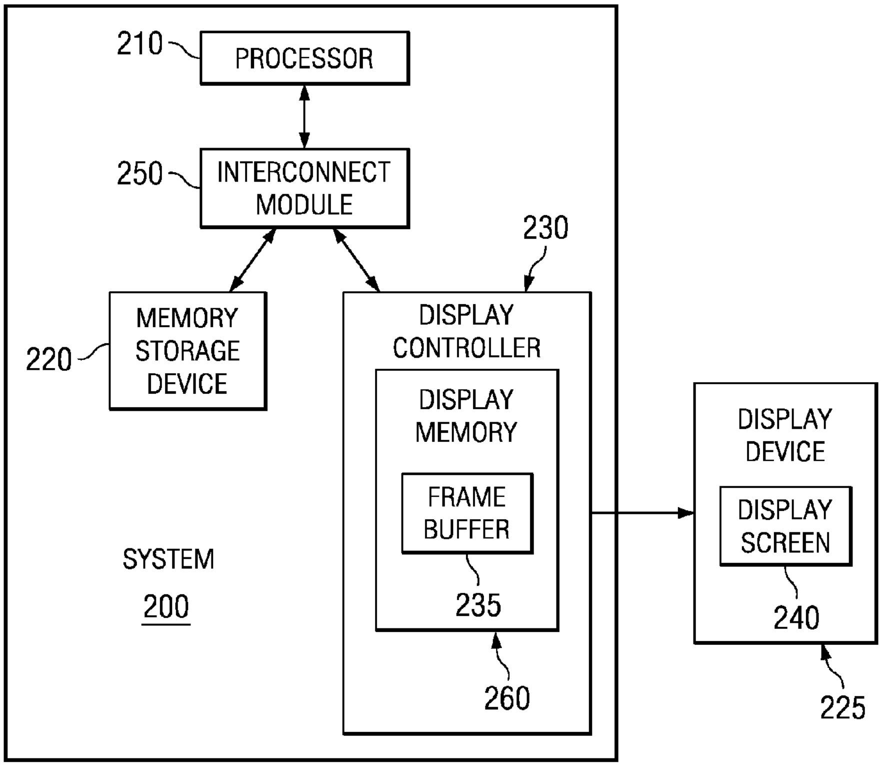
FIG. 2 shows a system containing a display controller coupled to an external display device.

Turning now to FIG. 2, a system 200 containing a display controller 230 coupled to an external display device 225 is shown. System 200 comprises an interconnect module 250 coupled to a processor 210, a memory storage device 220, and a display controller 230. Display controller 230 contains a display memory 260. Display controller 230 couples to display device 225.

Display memory 260 contains a frame buffer 235 capable of storing frames of information for transfer to display device 225. The frames of information may be displayed on a display screen 240. Frame buffer 235 may be filled with frames of information by a device component such as processor 210 or another component not shown in FIG. 2.

As described above, the device component fills frame buffer 235 with frames of information through interconnect module 250. Interconnect module 250 is capable of routing information between components of system 200. The device component may transmit frames of information to frame buffer 235 at a rate much faster than display controller 260 may transfer the frames of information to display device 225. When frame buffer 235 is full, the device component no longer transfers frames of information to frame buffer 235. The device component may perform other tasks, such as processing information or interacting with other components of system 200.

Display device 225 displays frames of information from frame buffer 235 on display screen 240. When frame buffer 235 reaches a low threshold, which indicates that the frame buffer 235 needs to be filled, the device component fills frame buffer 235.

System 200 may enter a state in which frames of information displayed on display screen 240 do not change over a period of time. For example, a cell phone may be in an idle state in which portions of system 200 are inactive. Display screen 240 of the cell phone may be continually refreshed with the same frames of information. Because the frames of information displayed on display screen 240 are not changing, frame buffer 235 may not need to be filled by the device component. Thus, processor 210, interconnect module 250, and memory storage device 220 may enter a power saving state, and power and clock signals to the components may be limited or removed. These components may exit the power saving state when frame buffer 235 needs to be updated. For instance, frame buffer 235 may be updated as a time display on display screen 240 changes, a user dials a number, or a user activates a preprogrammed function such as a game or a contact list.

The power saving techniques described above may be useful in systems that are battery dependent devices such as cellular telephones, gaming devices, PDAs, laptop computers, and music players. For system 200 to enter the power saving state when the frames of information for the image displayed on display screen 240 is not changing, frame buffer 235 must have the capacity to store all frames of information for the unchanging image. However, a large display screen 240 may require a large frame size and a large frame buffer 235. Thus, system 200 may contain two potentially costly large memory devices in memory storage device 220 and display memory 260. While system 200 allows processor 210, interconnect module 250, and memory storage device 220 to enter power saving states, integrating display memory 260 in display controller 230 may result in undesired cost and may take up additional space in system 200.

Figure 3:
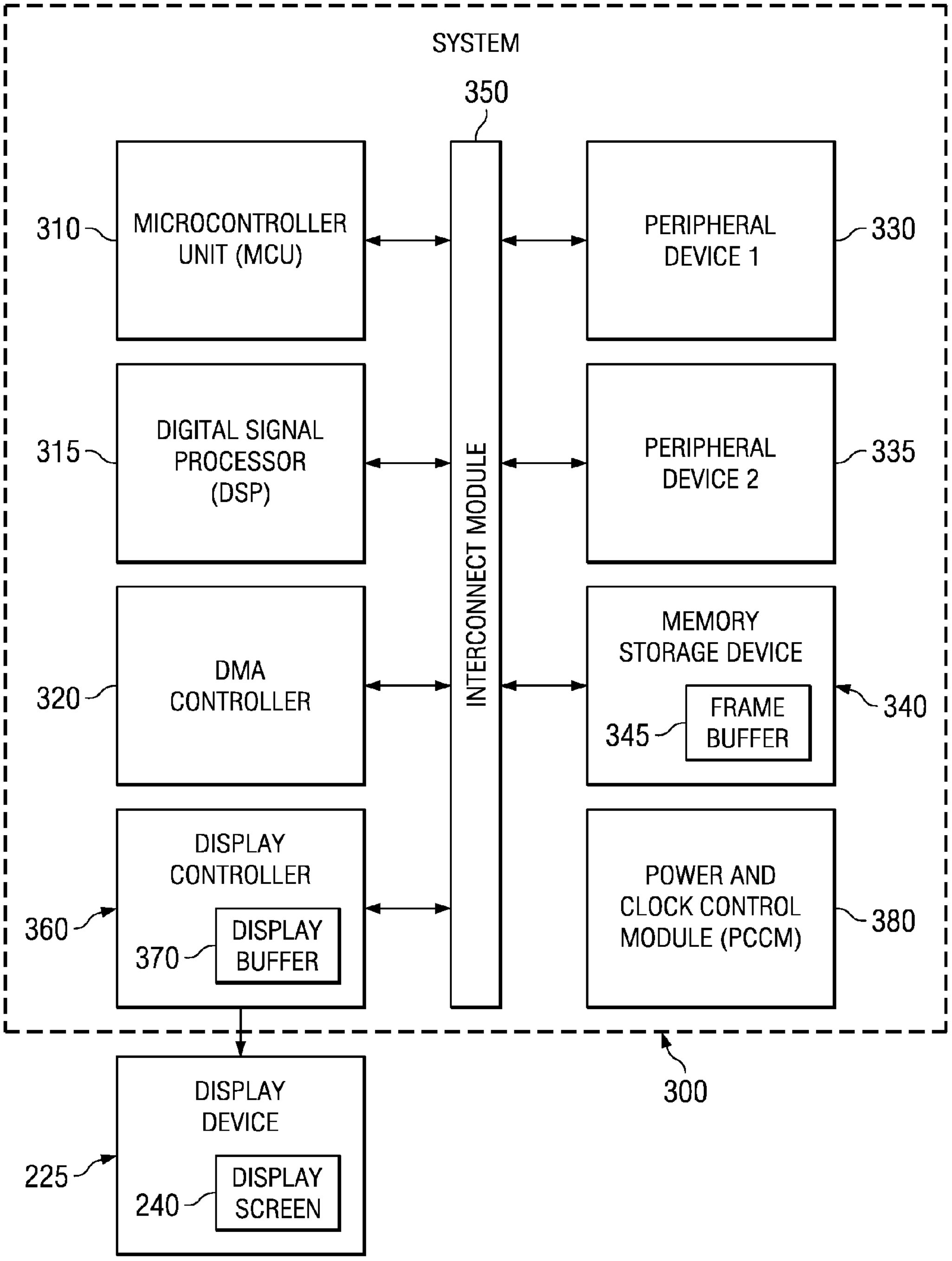
FIG. 3, in accordance with some embodiments of the invention, shows a system containing a plurality of modules and a display controller, the display controller connecting to an external display device.

Referring to FIG. 3, a system 300 comprises an interconnect module 350 coupled to a microcontroller unit (MCU)

310, digital signal processor (DSP) 315, direct memory access controller (DMA) controller 320, display controller 360, first peripheral device 330, second peripheral device 335, and memory storage device 340. A power and clock control module (PCCM) 380 couples to each component of system 300 through separate power and clock lines (not shown). Each power line (not shown) provides power to logic circuits in each module, and each clock line (not shown) provides a clock signal to logic circuits in each module for control and synchronization. In some embodiments of the invention, the clock lines may provide identical clock signals to each module, derived clock signals to each module, independent clock signals to each module, or multiple clock signals to each module from PCCM 380. In some embodiments of the invention, PCCM 380 may be capable of selectively activating and deactivating power and clock signals to the modules in system 300.

PCCM 380 may be capable of entering each component in system 300 into a power saving state and exiting each component from the power saving state. In some embodiments of the invention, interconnect module 350 may share a power and clock connection with memory storage device 340. Thus, memory storage device 340 may be capable of entering the power saving state when interconnect module 350 is capable of entering the power saving state and vice versa.

MCU 310 may be a processor capable of performing internal calculations and initiating read and write requests to components of system 300. DSP 315 may process digital signals such as sound, video, image, and communication signals. DMA controller 320 may transfer information between modules in system 300 without the involvement of MCU 310. First and second peripheral devices (330, 335) may each be an audio interface, a universal asynchronous receiver/transmitter (UART), universal serial bus (USB) port, or any other type of peripheral device.

An external display device 225 contains a display screen 240 capable of displaying visual information transferred from display controller 360. However, in some embodiments of the invention, system 300 may comprise display device 225. Display controller 360 contains a display buffer 370 capable of storing a portion of a single frame of information transmitted from memory storage device 340. Display controller 360 may constantly transfer frame information stored in display buffer 370 to display device 225. When display buffer 370 reaches a low threshold, which indicates that display buffer 370 needs more frame information, memory storage device 340 fills display buffer 370 with frame information.

In particular, frame information from a frame buffer 345 within memory storage device 340 fills display buffer 370. MCU 310, DSP 315, DMA controller 320, first peripheral device 330, or second peripheral device 335 may fill frame buffer 345. Frame buffer 345 may be capable of storing entire frames of information, while display buffer 370 may store only portions of a single frame of information. Thus, display buffer 370 must be filled more often than frame buffer 345.

Figure 4:
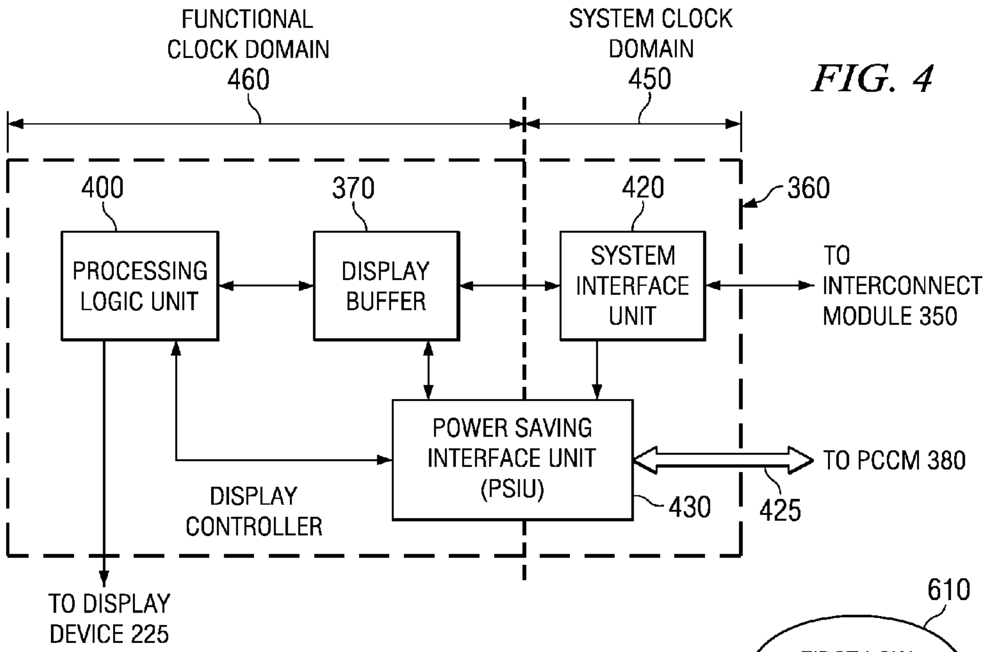
FIG. 4, in accordance with some embodiments of the invention, shows a display controller.

Turning now to FIG. 4, display controller 360 of FIG. 3 is shown in more detail. Display buffer 370 couples to a processing logic unit 400 and a system interface unit 420. System interface unit 420 receives frame information from memory storage device 340 (shown in FIG. 3) and fills display buffer 370. System interface unit 420 may alert a DMA controller or a processor when display buffer 370 needs to be filled with more frame information. In some embodiments of the invention, system interface unit 420 contains a direct memory access (DMA) system capable of transferring frame information from memory storage device 340 to display buffer 370.

Processing logic unit 400 receives frame information from display buffer 370 and converts the frame information into signals useable by display device 225. Processing logic unit 400 sends the signals to display device 225. In some embodiments of the invention, display buffer 370 may be a first-in first-out (FIFO) buffer.

Components of display controller 360 may operate in different clock domains. Different clock domains may include multiple clock signals from different sources or one clock signal that is modified into multiple clock signals. For example, system clock domain 450 contains components in display controller 360 that communicate with other components in system 300 (see FIG. 3) to fill display buffer 370. System clock domain 450 uses a clock signal that allows components, such as system interface unit 420 and power saving interface unit (PSIU) 430, to synchronously communicate with other components in system 300 (see FIG. 3).

Processing logic unit 400 and display buffer 370 may operate in a functional clock domain 460. Functional clock domain 460 contains components in display controller 360 that convert frame information in display buffer 370 into signals useable by display device 225. Components in functional clock domain 460 may not, for example, require as fast a clock speed as is needed for communication within system 300. By using a slower clock signal in functional clock domain 460, power consumption in display controller 360 may be reduced. Furthermore, in some embodiments of the invention, a clock driving components in system clock domain 450 may be turned off while a clock driving components in functional clock domain 460 may be operating normally. In some other embodiments of the invention, display controller 360 may contain more than two clock domains.

Communication between components in different clock domains may need interfacing circuitry. In a system containing two separate clock domains, such as display controller 360 shown in FIG. 4, components in each clock domain may communicate at different rates. When these components in different clock domains need to communicate with each other, interfacing circuitry may be necessary to ensure that no information is lost during communication between the components in different clock domains. For example, a component in a low speed clock domain may not be able to read information from a component in a high speed clock domain.

A power saving interface unit (PSIU) 430 is capable of operating in both functional clock domain 460 and system clock domain 450. This unit ensures error free flow of information from functional clock domain 460 to system clock domain 450 and vice versa. PSIU 430 couples to processing logic unit 400, display buffer 370, and system interface unit 420. PSIU 430 may interface between functional clock domain 460 and system clock domain 450. Further, PSIU 430 may communicate with PCCM 380 through bus 425 and detect when display controller 360 may enter or exit the power saving state. For example, PSIU 430 may detect that frame information in display buffer 370 is above the low threshold. Therefore, display buffer 370 does not need frame information from memory storage device 340. PSIU 430 indicates to PCCM 380 that display controller 360 may enter the power saving state. Power and the clock signal may be removed from system clock domain 450, thus conserving power in display controller 360. Components in functional clock domain 460 may still be active and may transmit frame information to display device 225. PSIU 430 may detect when display buffer 370 is near empty and reaches a low threshold and alerts PCCM 380. Display controller 360 may exit the power saving state, and power and the clock signal may be returned to system clock domain 450. System interface unit 420 may fill display buffer 370 with frame information from memory storage device 340.

In some embodiments of the invention, interconnect module 350 and display controller 360 may be in the same clock and power domain. Thus, the display controller 360 may enter the power saving state when interconnect module 350 is capable of entering the power saving state and vice versa.

In some other embodiments of the invention, display controller 360 may contain multiple display buffers 370 capable of storing frame information. The multiple display buffers 370 may couple to processing logic unit 400, system interface unit 420, and PSIU 430. Multiple display buffers 370 may allow display controller 360 to store more frame information than with a single display buffer 370. Thus, display controller 360 may stay in the power saving state longer because the display buffers 370 may need to be filled less frequently.

Figure 5:
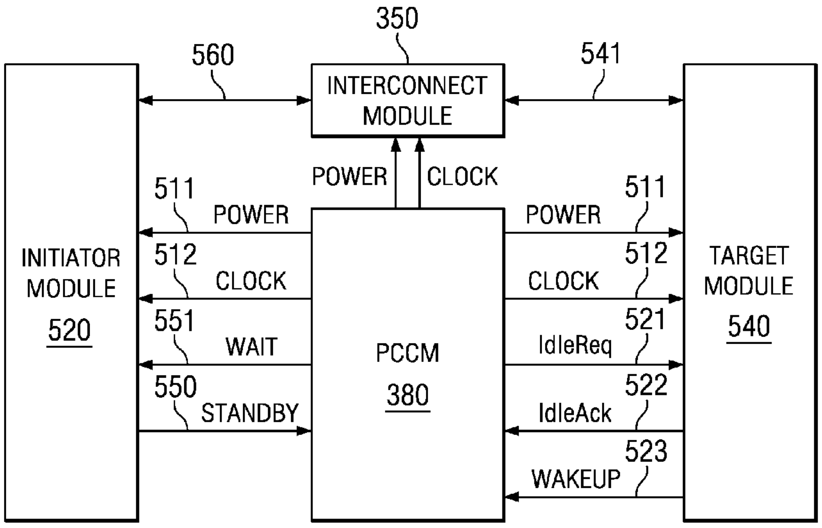
FIG. 5 shows a power and clock control module (PCCM) coupled to an initiator module, interconnect module, and target module.

When components of system 300 shown in FIG. 3 enter the power saving state described above, the components of system 300 may enter standby mode or idle mode. Standby mode is described in detail in the copending, commonly assigned patent application "Standby Mode for Power Management" by Dahan, et al., Ser. No. 11/559,388, filed Nov. 13, 2006. Additionally, idle mode is described in detail in the copending, commonly assigned patent application "Idle Mode for Power Management" by Dahan, et al., Ser. No. 11/559,387, filed Nov. 13, 2006. FIG. 5 shows a system using standby and idle mode.

Referring to FIG. 5, PCCM 380 couples to an initiator module 520, interconnect module 350, and target module 540. PCCM 380 provides power and a clock signal to each module through power line 511 and clock line 512, respectively. Power line 511 provides power to logic circuits in each module, and clock line 512 provides a clock signal to logic circuits in each module for control and synchronization. In some embodiments of the invention, clock line 512 may provide identical clock signals to each module, derived clock signals to each module, independent clock signals to each module, or multiple clock signals to each module from PCCM 380. In some embodiments of the invention, PCCM 380 may be capable of selectively activating and deactivating power and clock signals to initiator module 520, interconnect module 350, and target module 540.

Interconnect module 350 couples to both initiator module 520 and target module 540 and may be any logic circuitry capable of routing information, such as data and instructions, from initiator module 520 to target module 540. Further, interconnect module 350 may communicate interrupts and DMA requests between target module 540 and initiator module 520. An interrupt is a signal that momentarily interrupts initiator module 520 processing and indicates to initiator module 520 that a predefined event has occurred within target module 540. If initiator module 520 is a DMA controller, a DMA request is a request from target module 540 to the DMA controller to transfer information to target module 540.

Interconnect module 350 may consist of a bus, which may be described as a set of conductors coupled between modules of the electronic device. Interconnect module 350 may be an interconnection network, which is a collection of buses connected together to form a mesh with nodes at the bus intersections, the buses including logic circuitry that can route information from one module at a node to another module at another node. Further, interconnect module 350 may be any other device capable of routing information between modules.

Initiator module 520 is any logic circuitry within an electronic device that generates write or read requests. Initiator module 520 may be a processor, direct memory access (DMA) controller, digital signal processor (DSP), video accelerator, peripheral device, display controller, or any other type of device capable of initiating write or read instructions. Initiator module 520 connects to interconnect module 350 through connection 560.

Target module 540 is any logic circuitry within an electronic device that is the destination of a write or read request in the device. Target module 540 may be a memory device, such as a register, cache, external static random access memory or DRAM, or a peripheral device such as a display device. Interconnect module 350 connects to target module 540 through connection 541. Display controller 360 shown in FIG. 3, for example, may be an initiator module capable of initiating read requests to memory storage device 340, which may be a target module.

In some embodiments of the invention, multiple initiator modules 520 and target modules 540 may be present (not shown in FIG. 5) and interconnect module 350 may serve to coordinate the flow of information between the modules.

Initiator modules 520, interconnect modules 350, and target modules 540 in an electronic device may include circuitry which are not contiguously placed next to each other but rather distributed throughout the device. Thus, the modules shown in FIG. 5 may be considered a logical partitioning of the circuits on an electronic device rather than a physical partitioning. For example, consider a chip containing the circuitry for a processor and a cache. The processor circuitry may be located on different parts of the chip and contiguous to or mixed in with the cache circuitry. Circuitry for the processor may be logically grouped into an initiator module and the circuitry for the cache may be logically grouped into a target module. Similarly, the chip may contain bus circuitry that is distributed along different parts of the chip and which connects the processor circuitry and cache circuitry. The bus circuitry may be logically grouped into an interconnect module.

When initiator module 520 no longer initiates read or write requests to target module 540, PCCM 380 may deactivate or limit power and the clock signal transmitted to initiator module 520 to reduce power consumed by logic circuitry in initiator module 520. Thus, initiator module 520 may enter a standby mode in which it consumes less power and may not use the clock signal. Initiator module 520 may exit standby mode if a read or write request needs to be initiated to other components of the device. To exit standby mode, initiator module 520 informs PCCM 380 to activate the power and the clock signal.

In some embodiments of the invention, initiator module 520 may detect when it may be able to enter standby mode. Initiator module 520 communicates to PCCM 380 that initiator module 520 is ready to enter standby mode under conditions as described below. For instance, initiator module 520 may detect that no read or write requests have been initiated over a number of clock cycles. Initiator module 520 may then communicate to PCCM 380 by activating a standby signal through a standby line 550. Once initiator module 520 activates the standby signal, initiator module 520 may no longer initiate requests to target module 540. Initiator module 520 enters standby mode after PCCM 380 activates the wait signal to initiator module 520 through wait line 551.

When initiator module 520 enters standby mode, PCCM 380 may reduce or eliminate power sent to initiator module 520 and turn off the clock signal transmitted to initiator module 520. In some other embodiments, PCCM 380 may reduce the frequency of the clock signal. Thus, initiator module 520 may utilize the clock signal while reducing power consumption. Power and clock signals to interconnect module 350 and target module 540 may also be removed. In some embodiments of the invention, PCCM 380 may reduce or eliminate power to initiator module 520 and turn off the clock signal to initiator module 540 once initiator module 520 enters standby mode.

If an event causes initiator module 520 to begin exit from standby mode, initiator module 520 deactivates the standby signal. However, PCCM 380 may not deactivate the wait signal until the power and clock signals to initiator module 520, interconnect module 350, and target module 540 from PCCM 380 reach steady state operating conditions. Only after the clock and power signals have reached steady state and PCCM 380 has deactivated the wait signal does initiator module 520 exit standby mode and resume normal operation. In some embodiments of the invention, initiator module 520 may not execute instructions or initiate requests to target module 540 until PCCM 380 deactivates the wait signal. In some other embodiments of the invention, initiator module 520 may be designed to operate in a low power or low clock frequency environment during standby mode to perform "background" processing.

When initiator module 520 enters standby mode, PCCM 380 may deactivate or limit the power and the clock signal transmitted to target module 540 to reduce the power consumed by the logic circuitry in target module 540. Thus, the target module may enter an idle mode in which it consumes less power and may not use one or more clock signals from PCCM 380. If multiple initiator modules connect to PCCM 380 and interconnect module 350, PCCM 380 may deactivate or limit the power and the clock signal to target module 540 if all initiator modules are in standby mode that are capable of sending requests to target module 540. Target module 540 may exit idle mode if initiator module 520 exits standby mode or target module 540 needs to send an interrupt or DMA request to initiator module 520.

For target module 540 to enter idle mode, PCCM 380 first activates an IdleReq signal to target module 540 through an IdleReq line 521 when initiator module 520 enters standby mode. If the IdleReq signal is active and target module 540 does not need to transmit an interrupt or DMA request, an IdleAck signal is activated to PCCM 380 through an IdleAck line 522. Once the IdleAck signal is activated, target module 540 may be in idle mode and may no longer transmit interrupt signals or DMA requests to initiator module 520. When PCCM 380 receives the IdleAck signal, PCCM 380 may reduce or eliminate power sent to target module 540 and turn off one or more clock signals transmitted to target module 540, depending on the level of target module 540 functionality in idle mode. Alternatively, PCCM 380 may reduce the frequency of the one or more clock signals to target module 540. Thus, target module 540 may utilize the one or more clock signals while reducing power consumption.

Target module 540 may not communicate with any modules in the device other than PCCM 380 while in idle mode. If target module 540 needs to communicate with other components of the device, target module 540 must exit idle mode before any communication may occur. If a condition which may cause target module 540 to begin exit from idle mode occurs, as described below, target module 540 may activate a wakeup signal to PCCM 380 through a wakeup line 523. After PCCM 380 receives the wakeup signal, PCCM 380 returns the power and clock signals to steady state operating conditions. PCCM 380 then deactivates the IdleReq signal, and target module 540 deactivates the IdleAck signal and exits idle mode.

Target module 540 may also exit from idle mode if initiator module 520 exits standby mode. Thus, PCCM 380 returns the power and clock signals to steady state operating conditions and deactivates the IdleReq signal. Target module 540 may then receive and process requests from initiator module 520.

If all initiator modules and target modules connected to the interconnect module 350 are in standby mode or idle mode, respectively, the interconnect module 350 may enter a power saving mode because the interconnect module 350 may not have information to transmit. In power saving mode, PCCM 380 may deactivate or limit power and the clock signal transmitted to the interconnect module 350. PCCM 380 may activate power and the clock signal to interconnect module 350 if an initiator module 520 or target module 540 exits standby mode or idle mode, respectively.

This technique of placing initiator module 520 in standby mode, target module 540 in idle mode, and interconnect module 350 in power saving mode may reduce power consumption within the device. For example, while the amount of power saved each time a target module 540 enters idle mode may not be significant, the cumulative effect of power saved over time as target module 540 enters idle mode may be considerable. Because multiple initiator modules 520, interconnect modules 350, and target modules 540 may be present in the device, standby mode in the initiator module, idle mode in the target module and power saving mode in the interconnect module may save significant amounts of power. Thus, standby mode, idle mode, and power saving mode allow battery powered devices, such as laptop computers, portable music players, cellular telephones, personal digital assistants (PDA), and other portable electronic devices, to reduce power consumption and increase battery life.

Returning to FIG. 4, display controller 360 may use standby mode as described above. For example, PSIU 430 may connect to PCCM 380 through standby and wait lines and may thus enter display controller 360 into standby mode when display buffer 370 is above a threshold level. In standby mode, power and the clock signal to system clock domain 450 may be limited or removed. Functional clock domain 460 may remain active, and processing logic module 400 may transmit signals to display device 225. PSIU 430 may exit display controller from standby mode when display buffer 370 reaches the low threshold level and display buffer 370 is to be filled with frame information.

In some other embodiments of the invention, display controller 360 may use idle mode as described above. Thus, PSIU 430 may couple to PCCM 380 through an IdleReq line, IdleAck line, and wakeup line.

MCU 310, DSP 315, and DMA controller 320 shown in FIG. 3 may be initiator modules capable of entering standby mode. Separate standby and wait lines (not shown in FIG. 3) may couple from PCCM 380 to MCU 310, DSP 315, and DMA controller 320. In some embodiments, first peripheral device 330, second peripheral device 335, and memory storage device 340 may be target modules capable of entering idle mode. The IdleReq, IdleAck, and wakeup lines are not shown in FIG. 3. In some other embodiments, the peripheral devices (330, 335) may also be initiator modules. Furthermore, power and the clock signal may be removed from interconnect module 350 if components connected to interconnect module 350 enter their respective power saving modes.

Figure 6:
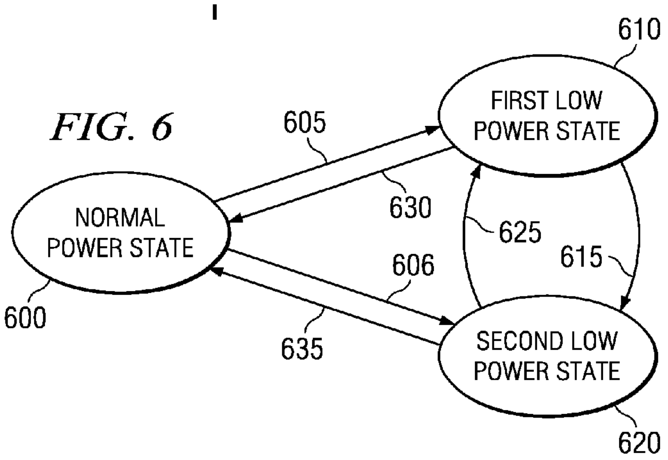

Turning now to FIG. 6, a state diagram for display controller 360 including a normal power state 600, first low power state 610, and second low power state 620 is shown. In normal power state 600, all or most of the components shown in FIG. 3 are active. When display buffer 370 is being filled with frame information from memory storage device 340, the remaining components of system 300, if inactive, may enter their respective power saving states and transition 605 to first low power state 610. In first low power state 610, MCU 310, DSP 315, and DMA controller 320 may enter standby mode, while first peripheral device 330 and second peripheral device 335 may enter idle mode.

When display buffer 370 is full of frame information, display controller 360 may enter standby mode if inactive, memory storage device 340 may enter idle mode if inactive, and power and the clock signal may be removed from interconnect module 350. This may be described as a second low power state 620. In some embodiments of the invention, the system shown in FIG. 3 may transition 606 to second low power state 620 from normal power state 600.

When display buffer 370 needs to be filled with more frame information, system 300 transitions to first low power state 610. Display controller 360 exits standby mode, power and the clock signal return to interconnect module 350, and memory storage device 340 exits idle mode. Display buffer 370 may fill with frame information from frame buffer 345. Once display buffer 370 is filled with the frame information, system 300 may transition to second low power state 620. System 300 may alternate (615, 625) between first low power state 610 and second low power state 620 until one of the device components other than display controller 360 and memory storage device 340 exits the power saving state. System 300 may transition (630, 635) to a normal power state 600 at any time during first low power state 610 or second low power state 620. In normal power state 600, some or all of components in system 300 may be operating outside of a power saving state. In some embodiments of the invention, more than two low power states may be implemented in system shown in FIG. 3 and described by state diagram of FIG. 6. For instance, MCU 310 may be active in some situations, while some components in system 300 remain in their respective low power states.

As an example of the state diagram shown in FIG. 6, consider system 300 shown in FIG. 3 contained in a cell phone with a large display screen 240. When a user is using the cell phone, system 300 is in normal power state 600. If the user leaves the cell phone on a table and walks away, system 300 may transition (605, 606) to first low power state 610 or second low power state 620 and oscillate between the two low power states. Inactive components within system 300 may enter standby mode and idle mode, and display controller 360 may continually refresh display screen 240. When the user returns and begins to operate the cell phone, system 300 returns to normal power state 600.

System 300 shown in FIG. 3 uses frame buffer 345 in memory storage device 340 and display buffer 370 to transfer frame information to display device 225. This technique is both space and cost efficient and is compatible with both standby and idle power management systems. Thus, the display system described above is suitable for power conservation in a portable electronic device with a large display screen.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus, comprising:

a display controller including a display buffer, a system interface unit for transferring information to the display buffer, and a power saving interface unit coupled to the display buffer and the system interface unit, wherein the power saving interface unit detects when frame information in the display buffer is above a threshold level and provides a first signal indicating that the display controller may enter a standby mode and detects when frame information in the display buffer is below a threshold level and provides a second signal indicating the display controller should exit the standby mode;

a memory storage device coupled to an interconnect module;

the interconnect module coupled to the system interface unit and memory storage device for transmitting information from the memory storage device to the system interface unit;

and a control module coupled to the display controller, the interconnect module, and the memory storage device to provide power and a clock signal to the power saving interface unit, the interconnect module, and the memory storage device, wherein the control module is responsive to the first signal to enter the standby mode by limiting the power and clock signal to the display controller and responsive to the second signal to exit the standby mode by restoring the power and clock signal to the display controller.

2. The apparatus of claim 1, wherein the display controller further includes a processing logic unit coupled to the display buffer, wherein the processing logic unit is capable of converting frame information from the display buffer to signals useable by the display device.

3. The apparatus of claim 1, further comprising:

a microcontroller unit (MCU) coupled to the interconnect module;

a digital signal processor (DSP) coupled to the interconnect module;

a direct memory access (DMA) controller coupled to the interconnect module; and one or more peripheral devices coupled to the interconnect module, wherein the interconnect module is capable of routing information between the MCU, DSP, DMA controller, display controller, memory storage device, the one of more peripheral devices, and the control module.

4. The apparatus of claim 3, wherein the interconnect module, MCU, DSP, DMA controller, and the one or more peripheral devices are capable of entering a power saving mode.

5. The apparatus of claim 3, wherein the display controller receives a first power and clock signal from the control module and the interconnect module, MCU, DSP, DMA controller, memory storage device, and the one or more peripheral devices receive a second power and clock signal from the control module.

6. The apparatus of claim 3, wherein the display controller, the interconnect module, and the memory storage device receive a first power and clock signal from the control module and the MCU, DSP, DMA controller, and the one or more peripheral devices receive a second power and clock signal from the control module.

* * * * *